(12) United States Patent
Lee et al.

(10) Patent No.: US 11,724,685 B2
(45) Date of Patent: Aug. 15, 2023

(54) METHOD OF CONTROLLING ENGINE AND TRANSMISSION OF HYBRID VEHICLE

(71) Applicants: Hyundai Motor Company, Seoul (KR); Kia Motors Corporation, Seoul (KR)

(72) Inventors: Jaebin Lee, Gyeonggi-do (KR); Jun Sung Park, Gyeonggi-do (KR); Tae Won Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 388 days.

(21) Appl. No.: 17/038,365

(22) Filed: Sep. 30, 2020

(65) Prior Publication Data
US 2021/0339732 A1    Nov. 4, 2021

(30) Foreign Application Priority Data
Apr. 29, 2020   (KR) .......................... 10-2020-0052727

(51) Int. Cl.
*B60W 20/15*      (2016.01)
*B60W 10/10*      (2012.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC ...... B60W 20/15; B60W 10/02; B60W 10/06; B60W 10/08; B60W 10/10; B60W 30/18072; B60W 2510/0638; B60W 2510/081; B60W 2510/1005; B60W 2510/104; B60W 2520/10; B60W 2520/105; B60W 2540/00; B60W 2710/027; B60W 2710/0605;
(Continued)

(56) References Cited

U.S. PATENT DOCUMENTS 6,307,277 B1 * 10/2001 Tamai ................... B60W 10/06
                                                    290/40 C
10,933,873 B2 *  3/2021 Park ...................... B60W 50/06
(Continued)

*Primary Examiner* — Sizo B Vilakazi
(74) *Attorney, Agent, or Firm* — Fox Rothschild LLP

(57) ABSTRACT

A method of controlling an engine and a transmission of a vehicle includes: determining, by a controller, whether the engine is restarted after releasing the vehicle's SSC (Start & Stop coasting) or whether the vehicle is accelerating during NCC (Neutral Coasting control), determining an RPM and gear stage of the transmission if it is determined that the engine is restarted after releasing the vehicle's SSC or the vehicle is accelerating during NCC, determining a mild hybrid starter and generator (MHSG) target RPM and an MHSG target RPM gradient of the vehicle, performing, by the controller, MHSG RPM control of the vehicle to follow the MHSG target RPM and the MHSG target RPM gradient, determining whether the MHSG RPM slips compared to the MHSG target RPM, and performing proportional-integral-derivative (PID) control to follow the MHSG target RPM if the MHSG RPM slips compared to the MHSG target RPM.

15 Claims, 16 Drawing Sheets

(51) Int. Cl.
*B60W 30/18* (2012.01)
*B60W 10/08* (2006.01)
*B60W 10/02* (2006.01)
*F02P 5/14* (2006.01)
*F02D 41/00* (2006.01)
*F02D 41/24* (2006.01)
*F02N 11/04* (2006.01)
*F02N 11/08* (2006.01)
*F16H 61/02* (2006.01)
*B60W 10/06* (2006.01)

(52) U.S. Cl.
CPC ...... *B60W 10/10* (2013.01); *B60W 30/18072* (2013.01); *F02D 41/0002* (2013.01); *F02D 41/2406* (2013.01); *F02N 11/04* (2013.01); *F02N 11/0848* (2013.01); *F02P 5/14* (2013.01); *F16H 61/0213* (2013.01); *B60W 2510/0638* (2013.01); *B60W 2510/081* (2013.01); *B60W 2510/104* (2013.01); *B60W 2510/1005* (2013.01); *B60W 2520/10* (2013.01); *B60W 2520/105* (2013.01); *B60W 2540/00* (2013.01); *B60W 2710/027* (2013.01); *B60W 2710/0605* (2013.01); *B60W 2710/0644* (2013.01); *B60W 2710/0661* (2013.01); *B60W 2710/081* (2013.01); *B60W 2710/082* (2013.01)

(58) Field of Classification Search
CPC . B60W 2710/0644; B60W 2710/0661; B60W 2710/081; B60W 2710/082; B60W 20/40; B60W 2050/0011; B60W 2510/082; B60W 2510/1015; B60W 2540/10; B60W 20/00; B60W 40/105; B60W 40/107; B60W 50/06; B60W 2510/101; B60W 2710/0611; F02D 41/0002; F02D 41/2406; F02D 31/001; F02D 41/2422; F02D 2200/101; F02D 41/0215; F02D 41/065; F02D 29/02; F02D 41/0225; F02D 2009/0201; F02D 2200/502; F02N 11/04; F02N 11/0848; F02N 11/0814; F02P 5/14; F02P 5/1502; F02P 5/1504; F02P 5/1506; F16H 61/0213; F16H 2059/186; F16H 2059/366; F16H 2059/706; B60K 6/485; Y02T 10/40; Y02T 10/62; B60Y 2200/92
See application file for complete search history.

(56) References Cited

U.S. PATENT DOCUMENTS

2015/0315991 A1* 11/2015 Miura ..................... F02D 41/08
701/104
2021/0114598 A1* 4/2021 Byun ..................... B60W 10/06
2022/0032901 A1* 2/2022 Park ....................... B60W 20/15

* cited by examiner

FIG. 8

| Division | 0kph | 5kph | 10kph | 20kph | 30kph | 40kph | 50kph | ... | 250kph |
|---|---|---|---|---|---|---|---|---|---|
| 1 Stage | 600 | 600 | 800 | 900 | 1000 | 1000 | 1000 | ... | 1000 |
| 2 Stage | 600 | 600 | 800 | 900 | 1000 | 1000 | 1000 | ... | 1000 |
| 3 Stage | 600 | 600 | 800 | 900 | 1000 | 1000 | 1000 | ... | 1000 |
| 4 Stage | 600 | 600 | 800 | 900 | 1000 | 1000 | 1000 | ... | 1000 |
| 5 Stage | 600 | 600 | 800 | 900 | 1000 | 1000 | 1000 | ... | 1000 |
| 6 Stage | 600 | 600 | 800 | 900 | 1000 | 1000 | 1000 | ... | 1000 |

FIG. 9

| Division | 0 | 500 | 1000 | ... | 7000 |
|---|---|---|---|---|---|
| 0 | 0 | 0 | 0 | ... | 0 |
| 500 | 0 | 0 | 0 | ... | 0 |
| ... | ... | ... | ... | ... | ... |
| 4000 | 2000 | 1700 | 2000 | ... | 0 |
| 7000 | 3500 | 3300 | 3500 | ... | 0 |

FIG. 10

| Division | 0 | 500 | 1000 | ... | 3000 |
|---|---|---|---|---|---|
| 0 | 0 | 0 | 0 | ... | 0 |
| 500 | 0 | 0 | 0 | ... | 0 |
| ... | ... | ... | ... | ... | ... |
| 4000 | 4000 | 3500 | 3000 | ... | 0 |
| 7000 | 7000 | 6500 | 6000 | ... | 0 |

FIG. 14

| Division | 0 | 500 | 1000 | 2000 | 3000 | 4000 | 5000 | 6000 | 7000 |
|---|---|---|---|---|---|---|---|---|---|
| 0 | 0 | 0 | 0 | 0 | 0 | 0 | 0 | 0 | 0 |
| 500 | 500 | 500 | 500 | 500 | 500 | 500 | 500 | 500 | 500 |
| 1000 | 900 | 900 | 900 | 900 | 900 | 900 | 900 | 900 | 900 |
| 2000 | 1900 | 1900 | 1900 | 1900 | 1900 | 1900 | 1900 | 1900 | 1900 |
| 3000 | 2900 | 2900 | 2900 | 2900 | 2900 | 2900 | 2900 | 2900 | 2900 |
| 4000 | 3900 | 3900 | 3900 | 3900 | 3900 | 3900 | 3900 | 3900 | 3900 |
| 5000 | 4900 | 4900 | 4900 | 4900 | 4900 | 4900 | 4900 | 4900 | 4900 |
| 6000 | 5900 | 5900 | 5900 | 5900 | 5900 | 5900 | 5900 | 5900 | 5900 |

FIG. 15

| Division | 0 | 500 | 1000 | 2000 | 3000 | 4000 | 5000 | 6000 | 7000 |
|---|---|---|---|---|---|---|---|---|---|
| 0 | 0 | 500 | 500 | 600 | 800 | 1000 | 1200 | 1500 | 2000 |
| 500 | 0 | 0 | 500 | 800 | 800 | 800 | 800 | 800 | 800 |
| 1000 | 0 | 0 | 0 | 1000 | 1000 | 1000 | 1000 | 2000 | 2000 |
| 2000 | 0 | 0 | 0 | 0 | 1000 | 1000 | 2000 | 2000 | 2000 |
| 3000 | 0 | 0 | 0 | 0 | 0 | 2000 | 2000 | 2000 | 2000 |
| 4000 | 0 | 0 | 0 | 0 | 0 | 0 | 2000 | 2000 | 2000 |
| 5000 | 0 | 0 | 0 | 0 | 0 | 0 | 0 | 2000 | 2000 |
| 6000 | 0 | 0 | 0 | 0 | 0 | 0 | 0 | 0 | 2000 |

FIG. 16

| Division | 0 | 500 | 1000 | 2000 | 3000 | 4000 | 5000 | 6000 | 7000 |
|---|---|---|---|---|---|---|---|---|---|
| 0 | 0 | 500 | 1000 | 2000 | 3000 | 4000 | 5000 | 6000 | 7000 |
| 500 | 0 | 0 | 1000 | 2000 | 3000 | 4000 | 5000 | 6000 | 7000 |
| 1000 | 0 | 0 | 0 | 2000 | 3000 | 4000 | 5000 | 6000 | 7000 |
| 2000 | 0 | 0 | 0 | 0 | 3000 | 4000 | 5000 | 6000 | 7000 |
| 3000 | 0 | 0 | 0 | 0 | 0 | 4000 | 5000 | 6000 | 7000 |
| 4000 | 0 | 0 | 0 | 0 | 0 | 0 | 5000 | 6000 | 7000 |
| 5000 | 0 | 0 | 0 | 0 | 0 | 0 | 0 | 6000 | 7000 |
| 6000 | 0 | 0 | 0 | 0 | 0 | 0 | 0 | 0 | 7000 |

METHOD OF CONTROLLING ENGINE AND TRANSMISSION OF HYBRID VEHICLE

CROSS-REFERENCE TO RELATED APPLICATION

This application claims under 35 U.S.C. § 119 the benefit of Korean Patent Application No. 10-2020-0052727 filed in the Korean Intellectual Property Office on Apr. 29, 2020, the entire contents of which are incorporated herein by reference.

BACKGROUND

(a) Technical Field

The present disclosure relates to a method of controlling an engine and a transmission of a vehicle (for example, a hybrid vehicle), more specifically, to the method that can control a mild hybrid starter & generator (MHSG) RPM to follow an MHSG target RPM using an MHSG motor in a low RPM area during restart of the engine after canceling Start & Stop Coasting (SSC) or during vehicle acceleration during Neutral Coasting Control (NCC), and then smoothly improve the vehicle acceleration through engine RPM control at a specific RPM.

(b) Description of the Related Art

As is well known, hybrid electric vehicles use an internal combustion engine and battery power together. That is, the hybrid vehicle uses an efficient combination of the power of the internal combustion engine and the power of the motor.

Hybrid vehicles can be classified into a mild type and a hard type according to a power sharing ratio of the engine and the motor. A mild type hybrid vehicle (hereinafter referred to as a mild hybrid vehicle) is provided with a mild hybrid starter & generator (MHSG) that starts the engine or generates power by the output of the engine instead of the alternator. The hard type hybrid vehicle is provided with a starter & generator that starts the engine or generates power by the output of the engine, and a driving motor that drives the vehicle, respectively.

The mild hybrid vehicle can use MHSG to assist engine torque according to driving conditions, and recharge the battery (e.g., 48 V battery) through regenerative braking. Accordingly, fuel efficiency of the mild hybrid vehicle may be improved.

On the other hand, in a 48 V hybrid system, SSC (Start & Stop coasting) technology that satisfies fuel economy and eco-friendly regulations by turning off the transmission clutch under certain conditions and turning off the engine, and NCC (Neutral Coasting Control) technology that turns off only the transmission clutch under certain conditions, are used. SSC is a control technology that completely turns off the engine after the pedal is released and the clutch and engine RPM continue to decrease under certain conditions, and NCC is a control technology that maintains the clutch RPM after the clutch is OFF and the engine RPM is reduced to some extent.

However, as shown in FIGS. 1 and 2 (RELATED ART), when the engine restarts after the SSC is released, the vehicle generates noise due to the unstable engine RPM change (shaded portion in FIG. 1) or excessive engine RPM (shaded portion in FIG. 2). As a result, vehicle noise may be generated, thereby deteriorating ride comfort and fuel economy of the vehicle.

Accordingly, consistency of engine RPM behavior is required when the engine is restarted after the SSC is released or the vehicle is accelerated during NCC, and as shown in FIGS. 3 and 4, after stepping on the pedal, by removing the slip phenomenon (shaded portion of FIGS. 3 and 4) until the engine RPM and the transmission RPM is synchronized, the impact of the vehicle can be relieved. Accordingly, there is a need for an engine and transmission control technology capable of improving ride comfort, driving performance, fuel efficiency, and NVH (noise, vibration, and harshness).

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a method of controlling an engine and a transmission of a vehicle (e.g., a hybrid vehicle) that can control an MHSG RPM to follow an MHSG target RPM using an MHSG motor in the low RPM area during restart of the engine after canceling Start & Stop Coasting (SSC) or during vehicle acceleration during Neutral Coasting Control (NCC), and then smoothly improve the vehicle acceleration through engine RPM control at a specific RPM.

A method of controlling an engine and a transmission of a vehicle according to an exemplary embodiment of the present disclosure includes determining, by a controller, whether the engine is restarted after releasing the vehicle's SSC (Start & Stop coasting) or whether the vehicle is accelerating during NCC (Neutral Coasting control), determining, by the controller, an RPM and a gear stage of the transmission if it is determined that the engine is restarted after releasing the vehicle's SSC or the vehicle is accelerating during NCC, determining, by the controller, the MHSG target RPM and the MHSG target RPM gradient of the vehicle, performing, by the controller, MHSG RPM control of the vehicle to follow the MHSG target RPM and MHSG target RPM gradient, determining, by the controller, whether the MHSG RPM slips compared to the MHSG target RPM, and performing, by the controller, PID control to follow the MHSG target RPM if the MHSG RPM slips compared to the MHSG target RPM.

The method may further include, after performing PID control to follow the MHSG target RPM, determining, by the controller, whether the MHSG RPM has reached an engine intervention point, determining, by the controller, the RPM and gear stage of the transmission if the MHSG RPM has reached an engine intervention point, determining, by the controller, a first engine target RPM and a first engine target RPM slope of the vehicle, performing, by the controller, engine RPM control of the vehicle to follow the first engine target RPM and the first engine target RPM gradient, determining, by the controller, whether the engine RPM has slipped compared to the first engine target RPM, and performing, by the controller, PID control to follow the first engine target RPM if the engine RPM slips compared to the first engine target RPM if the engine RPM has slipped compared to the first engine target RPM.

The method may further include, after performing PID control to follow the first engine target RPM, determining, by the controller, whether the engine RPM has reached a transmission RPM control point, determining, by the controller, the RPM and gear stage of the transmission if the engine RPM has reached a transmission RPM control point, determining, by the controller, a second engine target RPM of the vehicle, performing, by the controller, PID control to follow the second engine target RPM, transmitting, by the controller, current engine RPM, second engine target RPM, and slip amount information between the current engine RPM and the second engine target RPM to a transmission management system (TMS), and controlling, by the controller, torque of a clutch based on the information transmitted to the TMS.

In determining the MHSG target RPM and the MHSG target RPM gradient of the vehicle, the controller may determine a speed of the vehicle, the controller may determine the MHSG RPM at the time of switching to the engine reference control calculated by the first map table preset for the speed and the gear stage, and the controller may determine the MHSG target RPM and the MHSG target RPM gradient calculated by the preset second map table for the MHSG RPM at the time of switching to the current MHSG RPM and the engine reference control.

The second map table may be presented as a value in which the MHSG RPM of an end point is increased compared to a case where there is no pedal operation of the vehicle when there is pedal operation of the vehicle.

In determining whether the MHSG RPM has reached an engine intervention point, the controller may determine that the engine intervention point has been reached if the MHSG RPM is 700 rpm/sec or more.

In performing PID control to follow the MHSG target RPM, it may be performed by adjusting the engine ignition timing with fast response and adjusting the throttle opening amount with long duration.

When the MHSG RPM overshoots the MHSG target RPM, the controller may control to retard the engine ignition timing and to reduce the throttle opening amount.

In determining a first engine target RPM and a first engine target RPM slope of the vehicle, the controller may determine the engine RPM at the time of switching to the transmission RPM control calculated by the third map table preset for the current engine RPM and the current transmission RPM, and the controller may determine a first engine target RPM and a first engine target RPM gradient calculated by a preset fourth map table for the engine RPM at the time of switching to the current engine RPM and the transmission RPM control.

The fourth map table may be presented as a value in which the engine RPM of an end point is increased compared to a case where there is no pedal operation of the vehicle when there is pedal operation of the vehicle.

In performing PID control to follow the first engine target RPM, it may be performed by adjusting the engine ignition timing with fast response and adjusting the throttle opening amount with long duration.

When the engine RPM overshoots the first engine target RPM, the controller may control to retard the engine ignition timing and to reduce the throttle opening amount.

In determining whether the engine RPM has reached a transmission RPM control point, it may be determined that the transmission RPM control point has been reached when the difference between the engine RPM and the transmission RPM is 50 rpm to 100 rpm.

In determining a second engine target RPM of the vehicle, the controller may set the second engine target RPM to 0.

In performing PID control to follow the second engine target RPM, it may be performed by adjusting the engine ignition timing with fast response and adjusting the throttle opening amount with long duration.

When the engine RPM overshoots the first engine target RPM, the controller may control to retard the engine ignition timing and to reduce the throttle opening amount.

According to an exemplary embodiment of the present disclosure, during restart of the engine after canceling Start & Stop Coasting (SSC) or during vehicle acceleration during Neutral Coasting Control (NCC), consistency of engine RPM behavior is secured, and the acceleration of the vehicle can be smoothly improved, and fuel efficiency, environmental regulations, and driving properties can all be improved.

BRIEF DESCRIPTION OF THE DRAWINGS

FIG. 8 is a view showing a first map table for calculating the MHSG RPM at the time of switching to the engine reference control in a method of controlling an engine and a transmission of a hybrid vehicle according to an exemplary embodiment of the present disclosure.

FIG. 9 is a view showing a second map table when there is no pedal operation for determining the MHSG target RPM and the MHSG target RPM gradient in a method of controlling an engine and a transmission of a hybrid vehicle according to an exemplary embodiment of the present disclosure.

FIG. 10 is a view showing a second map table when there is a pedal operation for determining the MHSG target RPM and the MHSG target RPM gradient in a method of controlling an engine and a transmission of a hybrid vehicle according to an exemplary embodiment of the present disclosure.

FIG. 14 is a view showing a third map table for calculating the first engine RPM at the time of switching to the transmission reference control in a method of controlling an engine and a transmission of a hybrid vehicle according to an exemplary embodiment of the present disclosure.

FIG. 15 is a view showing a fourth map table when there is no pedal operation for determining the first engine target RPM and the first engine RPM gradient in a method of controlling an engine and a transmission of a hybrid vehicle according to an exemplary embodiment of the present disclosure.

FIG. 16 is a view showing a fourth map table when there is a pedal operation for determining the first engine target RPM and the first engine RPM gradient in a method of controlling an engine and a transmission of a hybrid vehicle according to an exemplary embodiment of the present disclosure.

DETAILED DESCRIPTION OF THE EMBODIMENTS

Figure 1:
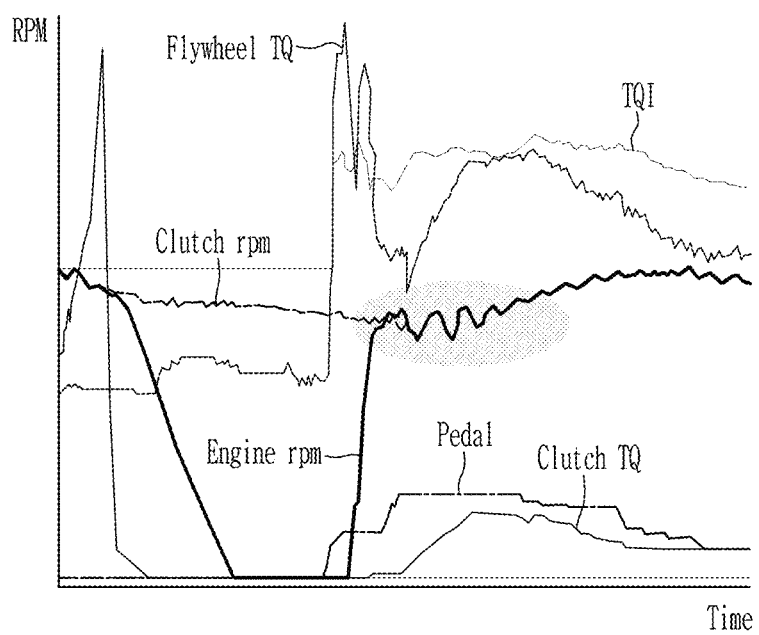
FIG. 1 (RELATED ART) is a view showing a change in the unstable engine RPM by clutch control when the engine restarts after SSC release of an existing vehicle.
Figure 2:
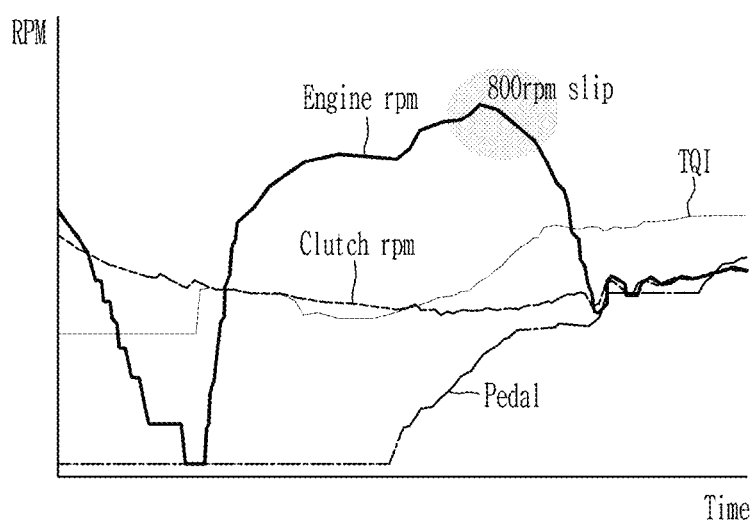
FIG. 2 (RELATED ART) is a view showing an excessive increase in engine RPM when the engine is restarted after SSC release of an existing vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Now, a method of controlling an engine and a transmission of a hybrid vehicle according to an exemplary embodiment of the present disclosure will be described with reference to FIG. 1, and FIGS. 7 to 16.

Figure 5:
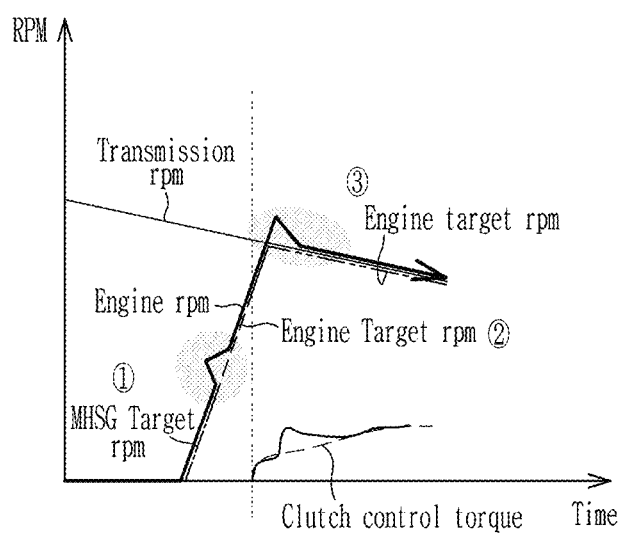
FIG. 5 is a view showing changes in engine RPM and transmission RPM when engine restarts after SSC release by a method of controlling an engine and a transmission of a hybrid vehicle according to an embodiment of the present disclosure.
Figure 7:
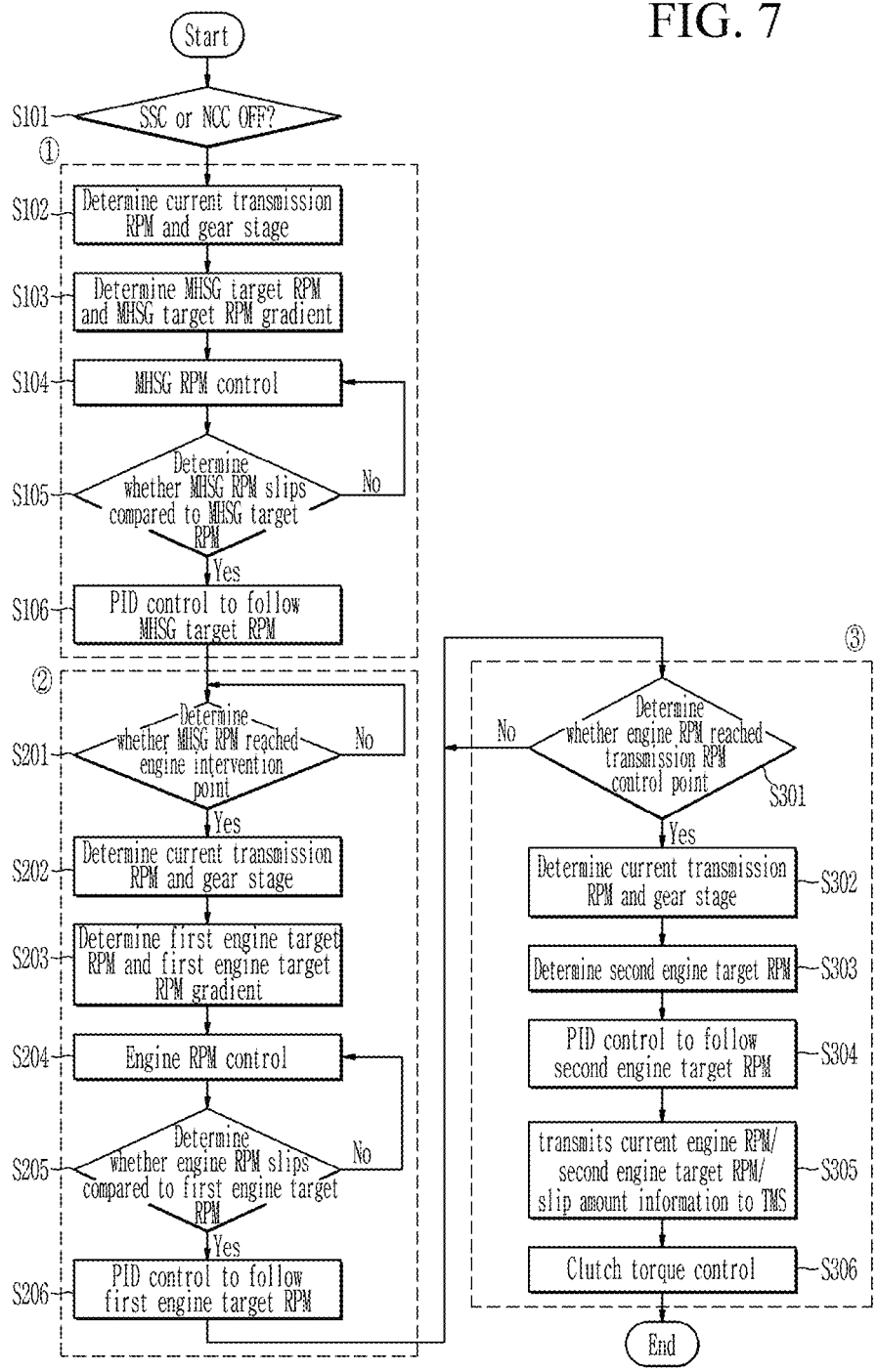
FIG. 7 is a flowchart illustrating a method of controlling an engine and a transmission of a hybrid vehicle according to an exemplary embodiment of the present disclosure.

FIG. 5 is a view showing changes in engine RPM and transmission RPM when engine restarts after SSC release by a method of controlling an engine and a transmission of a hybrid vehicle according to an embodiment of the present disclosure, and FIG. 7 is a flowchart illustrating a method of controlling an engine and a transmission of a hybrid vehicle according to an exemplary embodiment of the present disclosure.

Firstly, referring to FIG. 7, according to an exemplary embodiment of the present disclosure, a controller determines whether the engine is restarted after releasing the vehicle's SSC (Start & Stop coasting) or whether the vehicle is accelerating during NCC (Neutral Coasting control) (S101). In this case, the controller may be, for example, one or more microprocessors (e.g., an engine control unit or electronic control unit (ECU)) operated by a program, or hardware including the microprocessor. The program may include a series of instructions for performing a method of controlling an engine and a transmission of a hybrid vehicle according to an exemplary embodiment of the present disclosure.

Thereafter, if it is determined that the vehicle is restarted or the engine is accelerated during the NCC after the SSC is released, the controller proceeds to step ①, and the controller determines the RPM and gear stage of the current vehicle transmission (S102).

Then, the controller determines the MHSG target RPM and the MHSG target RPM gradient of the vehicle (S103). At this time, the MHSG target RPM and the MHSG target RPM gradient of the vehicle may be determined using a preset map table according to the hardware characteristics of the MHSG. For example, it may be determined using a preset map table using vehicle speed, vehicle gear stage, MHSG RPM, and the like. The first map table and the second map table for determining the MHSG target RPM and the MHSG target RPM gradient of the vehicle according to an exemplary embodiment of the present disclosure are illustrated as examples in FIGS. 8 to 10.

FIG. 8 is a view showing a first map table for calculating the MHSG RPM at the time of switching to the engine reference control in a method of controlling an engine and a transmission of a hybrid vehicle according to an exemplary embodiment of the present disclosure, FIG. 9 is a view showing a second map table when there is no pedal operation for determining the MHSG target RPM and the MHSG target RPM gradient in a method of controlling an engine and a transmission of a hybrid vehicle according to an exemplary embodiment of the present disclosure, and FIG. 10 is a view showing a second map table when there is a pedal operation for determining the MHSG target RPM and the MHSG target RPM gradient in a method of controlling an engine and a transmission of a hybrid vehicle according to an exemplary embodiment of the present disclosure.

Referring to FIG. 8, the first map table for the vehicle speed (horizontal axis) and gear stage (vertical axis) for determining the MHSG RPM at the time of switching to the engine reference control is presented. In addition, referring to FIG. 9, the MHSG RPM (vertical axis) at the time of switching to the engine reference control determined in FIG. 8 and the MHSG RPM of an end point for the current MHSG RPM (horizontal axis) are presented as a second table.

In particular, using the first map table, the MHSG RPM at the time of switching to the engine reference control is determined according to the current vehicle speed and gear stage.

Then, the MHSG RPM of the end point is determined using the second map table for the MHSG RPM (start point) of the current vehicle and the MHSG RPM at the time of switching to engine reference control. The gradient of the straight line connecting the start point and the end point is determined as the MHSG target RPM gradient.

Meanwhile, when there is no pedal operation, the map table of FIG. 9 may be used, and when there is pedal operation, the map table of FIG. 10 may be used.

Figure 11:
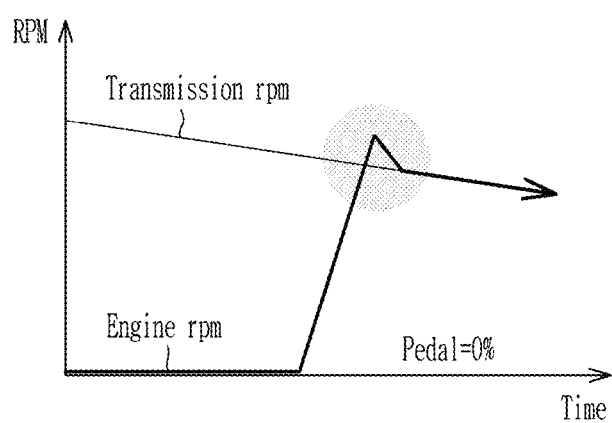
FIG. 11 is a view showing a change in engine RPM when there is no pedal operation when the engine is restarted after SSC release in a method of controlling an engine and a transmission of a hybrid vehicle according to an exemplary embodiment of the present disclosure.
Figure 12:
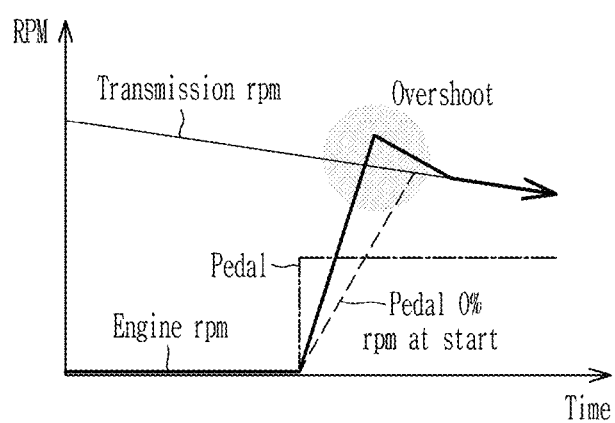
FIG. 12 is a view showing a change in engine RPM when there is a pedal operation when the engine is restarted after SSC release in a method of controlling engine and a transmission of a hybrid vehicle according to an exemplary embodiment of the present disclosure.

When there is pedal operation of the vehicle (FIG. 10), the MHSG RPM at the end point is presented as an increased value compared to when there is no pedal operation of the vehicle (FIG. 9). Accordingly, as shown in FIGS. 11 and 12, when there is pedal operation of the vehicle (FIG. 12), the MHSG target RPM gradient may be formed larger, and accordingly, the transmission RPM control timing may be advanced compared to a case where there is no pedal operation of the vehicle (FIG. 11).

If there is no pedal operation, the MHSG RPM at the time of switching to the engine reference control is determined by the first map table preset for the vehicle speed (horizontal axis) and gear stage (vertical axis), and the MHSG RPM of the end point is determined by a second table preset for the current MHSG RPM (start point, horizontal axis) and MHSG RPM (vertical axis) at the time of switching to engine reference control. Therefore, the straight line connecting the start point and end point is determined as the MHSG target RPM gradient. When the gradient of the MHSG target RPM of the straight line connecting the start point and the end point is determined, as time passes, the MHSG RPM at one point on the straight line is determined as the target RPM of the MHSG at that time.

When the MHSG target RPM gradient and the MHSG target RPM of the vehicle are determined, the controller performs MHSG RPM control of the vehicle to track the MHSG target RPM and MHSG target RPM gradient (S104). At this time, control may be performed in the same form as PID control used in idle speed control in the engine management system (EMS). PID control can be performed by adjusting the engine ignition timing and throttle opening amount.

Then, the controller determines whether the MHSG RPM slips compared to the MHSG target RPM (S105). As shown in FIG. 5, when the MHSG RPM deviates from the straight line connecting the start point and the end point and bounces (part ①), it is determined that the MHSG RPM slips compared to the MHSG target RPM.

Then, if the MHSG RPM is determined to slip compared to the MHSG target RPM, the controller performs PID control to follow the MHSG target RPM (S106). At this time, PID control may be performed by adjusting the engine ignition timing with fast response and adjusting the throttle opening amount with strong persistence. When the MHSG RPM overshoots the MHSG target RPM, the controller may control to retard the engine ignition timing and to reduce the throttle opening amount.

Figure 13:
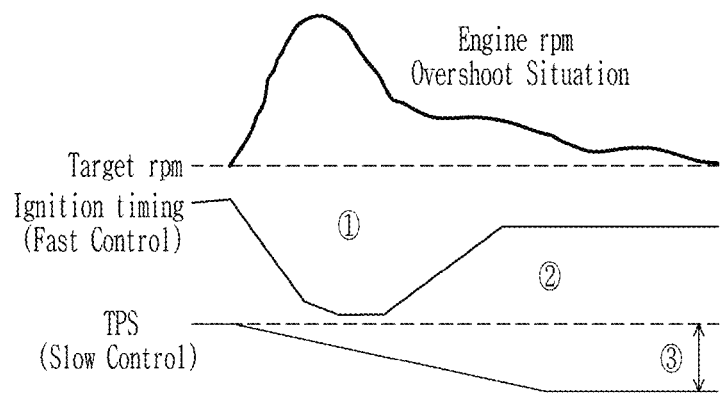
FIG. 13 is a conceptual diagram showing PID control for tracking the engine target RPM (MHSG target RPM) in the engine RPM (MHSG target RPM) overshoot situation compared to the engine target RPM (MHSG target RPM) in a method of controlling an engine and a transmission of a hybrid vehicle according to an embodiment of the present disclosure.

FIG. 13 is a conceptual diagram showing PID control for tracking the engine target RPM (MHSG target RPM) in the engine RPM (MHSG target RPM) overshoot situation compared to the engine target RPM (MHSG target RPM) in a method of controlling an engine and a transmission of a hybrid vehicle according to an embodiment of the present disclosure.

As shown in FIG. 13, when the MHSG RPM overshoots the MHSG target RPM, the controller retards the ignition timing in the control section (①) focused on the ignition timing among P and D gains with fast response, and reduces the throttle opening amount in the throttle position sensor (TPS)-oriented control section (②) among the P and D gains in which responsiveness is slow but advantageous in terms of persistence. Then, in section ③, the controller completes the correction by reflecting the deviation of the throttle opening amount to the I gain.

Figure 3:
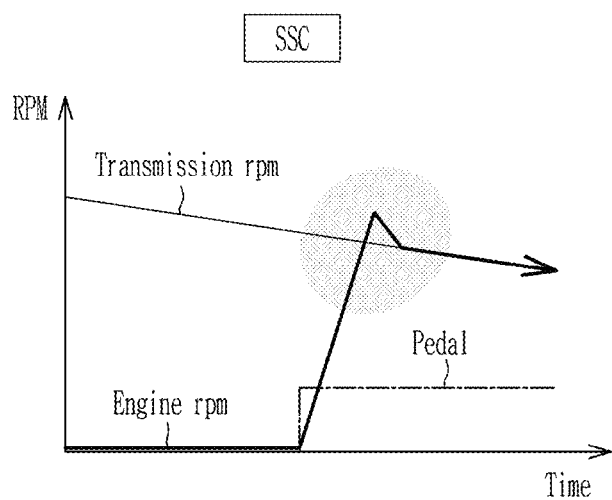
FIG. 3 is a view showing a change in engine RPM until the point when the engine RPM and the transmission RPM are synchronized when the engine is restarted after SSC release of a hybrid vehicle according to an exemplary embodiment of the present disclosure.

By the PID control according to FIG. 13, the vehicle's wobble can be removed and the sense of acceleration may be smoothed by controlling the MHSG RPM to follow the MHSG target RPM by removing the slip phenomenon of the MHSG RPM of the portion ① shown in FIG. 5. Accordingly, as shown in FIG. 3, when the engine is restarted after SSC is released, linearity may be improved by removing MHSG RPM and MHSG RPM inflection in the shaded portion.

Meanwhile, referring to FIG. 7 again, the method of controlling an engine and a transmission of a hybrid vehicle according to an exemplary embodiment of the present disclosure may further include, after performing PID control to follow the MHSG target RPM (S106), determining, by the controller, whether the MHSG RPM has reached an engine intervention point (S201). At this time, the determination of whether the MHSG RPM has reached the time of engine intervention is based on the hardware characteristics of the engine (control range, endurance limit, etc.). In the present disclosure, when the MHSG RPM is 700 rpm/sec or more, it may be determined that the engine intervention point has been reached. That is, while the engine RPM of the vehicle rises to the point of 700 rpm/sec, the MHSG RPM control is performed and the engine RPM control is performed more than that. The above criteria can be changed when the capacity of MHSG is increased or the durability is increased.

Then, if the MHSG RPM has reached an engine intervention point, the controller determines the RPM and gear stage of the current vehicle transmission (S202).

Then, the controller determines a first engine target RPM and a first engine target RPM slope of the vehicle (S203). At this time, the first engine target RPM and the first engine target RPM gradient may be determined using a preset map table according to the hardware characteristics of the engine. The third map table and the fourth map table for determining the engine target RPM and the engine target RPM gradient of the vehicle according to an exemplary embodiment of the present disclosure are illustrated as examples in FIGS. 14 to 16.

FIG. 14 is a view showing a third map table for calculating the first engine RPM at the time of switching to the transmission reference control in a method of controlling an engine and a transmission of a hybrid vehicle according to an exemplary embodiment of the present disclosure, FIG. 15 is a view showing a fourth map table when there is no pedal operation for determining the first engine target RPM and the first engine RPM gradient in a method of controlling an engine and a transmission of a hybrid vehicle according to an exemplary embodiment of the present disclosure, and FIG. 16 is a view showing a fourth map table when there is a pedal operation for determining the first engine target RPM and the first engine RPM gradient in a method of controlling an engine and a transmission of a hybrid vehicle according to an exemplary embodiment of the present disclosure.

Referring to FIG. 14, the engine RPM at the time of switching (starting point) to the transmission RPM control is determined using a third map table preset for the current engine RPM (horizontal axis) and the current transmission RPM (vertical axis).

Then, referring to FIG. 15, the engine RPM of the end point is determined using a preset fourth map table for the engine RPM (vertical axis) at the time of switching to the current engine RPM (horizontal axis) and transmission RPM control. The gradient of the straight line connecting the start point and the end point is determined as the first engine target RPM gradient.

Meanwhile, when there is no pedal operation, the map table of FIG. 15 may be used, and when there is pedal operation, the map table of FIG. 16 may be used. When there is pedal operation of the vehicle (FIG. 16), the engine RPM at the end point is presented as an increased value compared to when there is no pedal operation of the vehicle (FIG. 15). Accordingly, when there is pedal operation of the vehicle, the first engine target RPM gradient may be formed larger than when there is no pedal operation of the vehicle, and accordingly, the transmission RPM control point can be advanced.

When the gradient of the first engine target RPM of the straight line connecting the start point and the end point is determined, as time passes, the first engine RPM at one point on the straight line is determined as the engine target RPM at that time.

Then, if the first engine target RPM and the first engine target RPM gradient of the vehicle are determined, the controller performs engine RPM control of the vehicle to follow the first engine target RPM and the first engine target RPM gradient (S204). At this time, in the same way as the MHSG RPM control described above, PID control can be used. The PID control can be performed by adjusting the engine ignition timing and throttle opening amount.

Then, the controller determines whether the engine RPM has slipped compared to the first engine target RPM (S205). As shown in FIG. 5, when the engine RPM deviates from the straight line connecting the start point and the end point and bounces (part ①), it is determined that the engine RPM slips compared to the first engine target RPM.

Then, if it is determined that the engine RPM has slipped compared to the first engine target RPM, the controller performs PID control to follow the first engine target RPM (S206). At this time, PID control may be performed by adjusting the engine ignition timing with fast response and adjusting the throttle opening amount with strong persistence. When the engine RPM overshoots the first engine target RPM, the controller may control to retard the engine ignition timing and to reduce the throttle opening amount.

As shown in FIG. 13, when the engine RPM overshoots the first engine target RPM, the controller retards the ignition timing in the control section (①) focused on the ignition timing among P and D gains with fast response, and reduces the throttle opening amount in the throttle position sensor (TPS)-oriented control section (②) among the P and D gains in which responsiveness is slow but advantageous in terms of persistence. Then, in section ③, the controller completes the correction by reflecting the deviation of the throttle opening amount to the I gain.

By the PID control according to FIG. 13, the vehicle's wobble can be removed and the sense of acceleration may be smoothed by controlling the engine RPM to follow the first engine target RPM by removing the slip phenomenon of the engine RPM.

Meanwhile, referring to FIG. 7 again, the method of controlling an engine and a transmission of a hybrid vehicle according to an exemplary embodiment of the present disclosure may further include, after performing PID control to follow the first engine target RPM (S206), determining, by the controller, whether the engine RPM has reached a transmission RPM control point (S301). At this time, when the difference between the engine RPM and the transmission RPM is 50 rpm to 100 rpm, it may be determined that the transmission RPM control point has been reached.

Then, if the engine RPM has reached a transmission RPM control point, the controller determines the RPM and gear stage of the current vehicle transmission (S302).

Then, the controller determines a second engine target RPM of the vehicle (S303). At this time, the second engine target RPM may be set to 0.

Then, the controller performs PID control to follow the second engine target RPM (S304). At this time, PID control may be performed by adjusting the engine ignition timing with fast response and adjusting the throttle opening amount with strong persistence, and when the engine RPM overshoots the second engine target RPM, the controller may control to retard the engine ignition timing and to reduce the throttle opening amount.

Then, the controller transmits current engine RPM, second engine target RPM, and slip amount information between the current engine RPM and the second engine target RPM to a transmission management system (TMS) (S305). The slip amount between the current engine RPM and the second engine target RPM is represented by part ③ in FIG. 5.

Then, the controller controls torque of a clutch based on the information transmitted to the TMS (S306). Referring to FIG. 5, when the slip amount information expressed in part ③, between the current engine RPM and the second engine target RPM is transmitted to the TMS, the controller controls the engine RPM and the transmission RPM to be synchronized by applying a greater torque to the clutch than when there is no slip. The clutch torque control may be performed in an auxiliary manner in addition to the MHSG RPM control and engine RPM control described above, and is not greatly limited by the hardware characteristics of the transmission.

Figure 6:
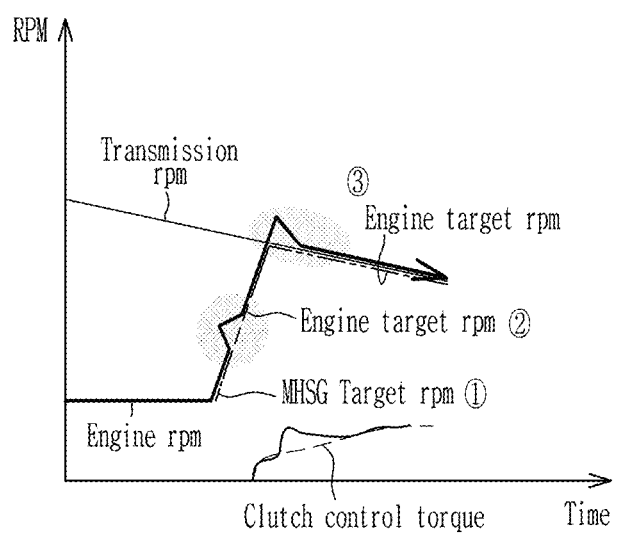
FIG. 6 is a view showing changes in engine RPM and transmission RPM during vehicle acceleration among NCCs by a method of controlling an engine and a transmission of a hybrid vehicle according to an exemplary embodiment of the present disclosure.

Meanwhile, FIG. 6 is a view showing changes in engine RPM and transmission RPM during vehicle acceleration among NCCs by a method of controlling an engine and a transmission of a hybrid vehicle according to an exemplary embodiment of the present disclosure. FIG. 6 shows a case where the engine RPM is an IDLE RPM other than 0 during vehicle acceleration among NCCs. In this case, as described with reference to FIGS. 5 and 7-16, the controller performs MHSG RPM control of the vehicle to track the MHSG target RPM and MHSG target RPM gradient, and if the MHSG RPM is determined to slip compared to the MHSG target RPM, the controller performs PID control to follow the MHSG target RPM. Then, if the MHSG RPM has reached an engine intervention point, the controller performs engine RPM control of the vehicle to follow the first engine target RPM and the first engine target RPM gradient, and if it is determined that the engine RPM has slipped compared to the first engine target RPM, the controller performs PID control to follow the first engine target RPM. Then, if the engine RPM has reached a transmission RPM control point, the controller determines a second engine target RPM of the vehicle, and the controller performs PID control to follow the second engine target RPM. When a slip occurs between the engine RPM and the second engine target RPM, the clutch torque is controlled in an auxiliary manner based on the slip amount information.

FIG. 6 is the same as the control when the engine is restarted after the SSC release in FIG. 5 except that it is a case where the engine RPM is an IDLE RPM other than 0 during vehicle acceleration among NCCs, therefore the following description will be omitted.

Figure 4:
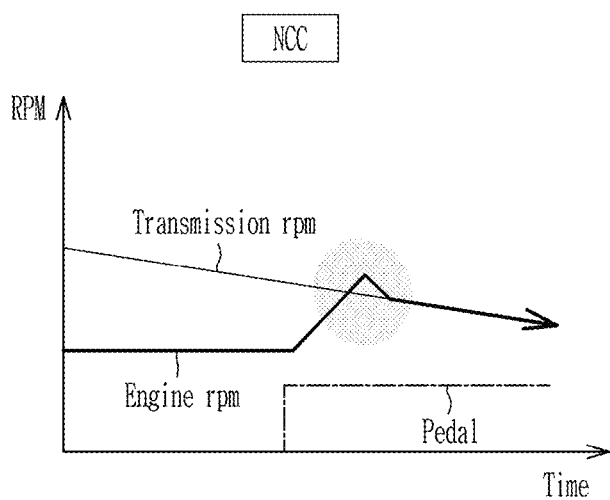
FIG. 4 is a view showing a change in engine RPM until a point in time when engine RPM and transmission RPM are synchronized during vehicle acceleration among NCCs of a hybrid vehicle according to an exemplary embodiment of the present disclosure.

As shown in FIGS. 3 and 4, linearity may be improved by removing MHSG RPM and engine RPM inflection in a shaded portion during vehicle acceleration among NCCs.

Similarly, a method of controlling an engine and a transmission of a hybrid vehicle can control an MHSG RPM to follow an MHSG target RPM using an MHSG motor in the low RPM area during restart of the engine after canceling Start & Stop Coasting (SSC) or during vehicle acceleration during Neutral Coasting Control (NCC), and then smoothly improve the vehicle acceleration through engine RPM control at a specific RPM. In addition, by controlling the transmission RPM in an auxiliary manner, fuel efficiency, environmental regulations, and operability can all be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method of controlling an engine and a transmission of a vehicle, the method comprising:
   determining, by a controller, whether the engine is restarted after releasing the vehicle's SSC (Start & Stop coasting) or whether the vehicle is accelerating during NCC (Neutral Coasting control);
   determining, by the controller, an RPM and gear stage of the transmission if it is determined that the engine is restarted after releasing the vehicle's SSC or the vehicle is accelerating during NCC;
   determining, by the controller, a mild hybrid starter and generator (MHSG) target RPM and an MHSG target RPM gradient of the vehicle;
   performing, by the controller, MHSG RPM control of the vehicle to follow the MHSG target RPM and the MHSG target RPM gradient;
   determining, by the controller, whether the MHSG RPM slips compared to the MHSG target RPM; and
   performing, by the controller, proportional-integral-derivative (PID) control to follow the MHSG target RPM if the MHSG RPM slips compared to the MHSG target RPM;
   wherein:
   in determining the MHSG target RPM and the MHSG target RPM gradient of the vehicle,
   the controller determines a speed of the vehicle,
   the controller determines the MHSG RPM at the time of switching to an engine reference control calculated by the first map table preset for the speed and the gear stage, and
   the controller determines the MHSG target RPM and the MHSG target RPM gradient calculated by the preset second map table for the MHSG RPM at the time of switching to the current MHSG RPM and the engine reference control.

2. The method of claim 1, further comprising:
   after performing PID control to follow the MHSG target RPM,
   determining, by the controller, whether the MHSG RPM has reached an engine intervention point;
   determining, by the controller, the RPM and the gear stage of the transmission if the MHSG RPM has reached the engine intervention point;
   determining, by the controller, a first engine target RPM and a first engine target RPM gradient of the vehicle;
   performing, by the controller, engine RPM control of the vehicle to follow the first engine target RPM and the first engine target RPM gradient;
   determining, by the controller, whether the engine RPM has slipped compared to the first engine target RPM; and
   performing, by the controller, PID control to follow the first engine target RPM if the engine RPM slips compared to the first engine target RPM if the engine RPM has slipped compared to the first engine target RPM.

3. The method of claim 2, further comprising:
   after performing PID control to follow the first engine target RPM,
   determining, by the controller, whether the engine RPM has reached a transmission RPM control point;
   determining, by the controller, the RPM and the gear stage of the transmission if the engine RPM has reached the transmission RPM control point;
   determining, by the controller, a second engine target RPM of the vehicle;
   performing, by the controller, PID control to follow the second engine target RPM;
   transmitting, by the controller, current engine RPM, second engine target RPM, and slip amount information between the current engine RPM and the second engine target RPM to a transmission management system (TMS); and controlling, by the controller, torque of a clutch based on the information transmitted to the TMS.

4. The method of claim 1, wherein:

the second map table is presented as a value in which the MHSG RPM of an end point is increased compared to a case where there is no pedal operation of the vehicle when there is pedal operation of the vehicle.

5. The method of claim 2, wherein:

in determining whether the MHSG RPM has reached an engine intervention point, the controller determines that the engine intervention point has been reached if the MHSG RPM is 700 rpm/sec or more.

6. The method of claim 1, wherein:

in performing PID control to follow the MHSG target RPM, it is performed by adjusting the engine ignition timing and adjusting the throttle opening amount with long duration.

7. The method of claim 6, wherein:

when the MHSG RPM overshoots the MHSG target RPM, the controller controls to retard the engine ignition timing and to reduce the throttle opening amount.

8. The method of claim 2, wherein:

in determining the first engine target RPM and the first engine target RPM gradient of the vehicle, the controller determines the engine RPM at the time of switching to the transmission RPM control calculated by the third map table preset for the current engine RPM and the current transmission RPM, and the controller determines the first engine target RPM and the first engine target RPM gradient calculated by a preset fourth map table for the engine RPM at the time of switching to the current engine RPM and the transmission RPM control.

9. The method of claim 8, wherein:

the fourth map table is presented as a value in which the engine RPM of an end point is increased compared to a case where there is no pedal operation of the vehicle when there is pedal operation of the vehicle.

10. The method of claim 2, wherein:

in performing PID control to follow the first engine target RPM, it is performed by adjusting the engine ignition timing and adjusting the throttle opening amount with long duration.

11. The method of claim 10, wherein:

when the engine RPM overshoots the first engine target RPM, the controller controls to retard the engine ignition timing and to reduce the throttle opening amount.

12. The method of claim 3, wherein:

in determining whether the engine RPM has reached the transmission RPM control point, it is determined that the transmission RPM control point has been reached when the difference between the engine RPM and the transmission RPM is 50 rpm to 100 rpm.

13. The method of claim 3, wherein:

in determining the second engine target RPM of the vehicle, the controller sets the second engine target RPM to 0.

14. The method of claim 3, wherein:

in performing PID control to follow the second engine target RPM, it is performed by adjusting the engine ignition timing and adjusting the throttle opening amount with long duration.

15. The method of claim 14, wherein:

when the engine RPM overshoots the second engine target RPM, the controller controls to retard the engine ignition timing and to reduce the throttle opening amount.

* * * * *